United States Patent [19]

Wylie

[11] Patent Number: 4,510,054

[45] Date of Patent: Apr. 9, 1985

[54] OIL RECOVERY APPARATUS

[76] Inventor: M. Martin Wylie, P.O. Box 271, Summerland, B.C., Canada, V0H 1Z0

[21] Appl. No.: 425,793

[22] Filed: Sep. 28, 1982

[51] Int. Cl.³ .................... B01D 23/00; E02B 15/04
[52] U.S. Cl. ................ 210/242.3; 210/416.1; 210/923; 182/82
[58] Field of Search ............ 210/923, 242.3, 242.1, 210/693, 416.1; 182/82; 166/265, 267

[56] References Cited

U.S. PATENT DOCUMENTS 2,876,903  3/1959  Lee ........................ 210/242.3
3,023,831  3/1962  Bevis ...................... 182/82
3,534,859  10/1970 Amero et al. ............. 210/923

FOREIGN PATENT DOCUMENTS 998624  10/1976  Canada .

OTHER PUBLICATIONS

Oil Spill Intelligence Report, vol. III, No. 45, 3 Nov. 1980, pp. 1-6.

Primary Examiner—Richard V. Fisher
Assistant Examiner—Sharon T. Cohen
Attorney, Agent, or Firm—Jones, Tullar & Cooper

[57] ABSTRACT

An oil spill recovery method and apparatus is disclosed. The method of recovery involves the pumping of an oil/water mixture from a concentration area to the submerged portion of a vertically oriented cylinder, open at both ends, and the separation of the oil from the water in the cylinder. Oil floats to and accumulates on the surface of the water in the cylinder and uncontaminated water flows out through the lower open end of the cylinder. The apparatus includes a collection unit which defines the concentration area within three walls thereof, a recovery unit which follows the collection unit and mounts the cylinder therein, and a submerged pumping unit which carries an oil/water mixture from the concentration area in the collection unit to the cylinder in the recovery unit. There is very little emulsification of the oil in the cylinder and hence there is very efficient separation of the oil from the water.

16 Claims, 2 Drawing Figures

OIL RECOVERY APPARATUS

The present invention is directed generally to an apparatus and a method for recovering oil from the surface of a body of water.

BACKGROUND OF THE INVENTION

In these days of giant oil tankers plying the seas there is an increasing danger of spillage of crude oil onto the surface of the oceans or inland waterways either through accident or mistake. There have already been enough such spillages for environmentalists to see that the damage to the ecology can be devastating when a spillage occurs and the spilled oil reaches shore. Additionally, the economic consequences of oil spillages are far-reaching, both from the standpoint of the losses incurred and the expense of attempting to recover the oil.

There have been many attempts at achieving an effective apparatus which will economically and efficiently recover oil following a spill. Such apparatus should be economical to produce, be readily transportable to the spill site, be relatively easy to operate and be efficient in its operation Several versions of oil skimming devices have been tried, such devices using a conveyor or other such apparatus to convey oil from the water surface upwardly to a waiting tank. Crude oil is extremely viscous and has the unwelcome property of sticking securely to almost anything it contacts. This leads to unending problems with conveyor-type recovery devices as they soon become clogged or bound by the oil itself.

One attempt at utilizing the properties of crude oil for recovery thereof is found in Canadian Pat. No. 998,624 issued Oct. 19, 1976 to Olsen. That patent teaches the utilization of a number of floating cells having openings adjacent the top through which an oil/water mixture passes by wave action into the cells. The mixture is pumped from each cell to a holding tank on board a ship or a barge. In the holding tank the oil floats to the top and uncontaminated water is returned to the sea through a ball float control valve by gravity. This device thus makes use of the lower specific gravity of the oil to achieve separation but it also has drawbacks. For example there is no control over the amount of oil/water mixture entering the cells as dependence is made on wave action to cause the mixture to enter the cells. Also the action of the cells and the subsequent pumping operation will result in unwanted emulsification of the oil in the water, making separation more difficult.

SUMMARY OF THE INVENTION

The present invention is similar to that of Canadian Pat. No. 998,624 in that it utilizes the lower specific gravity of the oil to achieve separation. However, the present invention permits a controlled flow of oil/water mixture to a recovery unit, not being dependent on wave action; does not require a separate ship or barge to carry a holding tank; and reduces the chance of emulsification of the oil, permitting more efficient recovery thereof.

The present invention utilizes a collection unit which very simply entails a vertically oriented retaining wall of generally U-shape which funnels the oil/water mixture from the mouth thereof as it is towed through the water to a concentration area defined by the wall. A recovery unit is towed by the collection unit and entails a vertically oriented open ended cylinder having portions above and below the water surface. A conduit leads from below the concentration area and exits into the lower portion of the cylinder, below the water surface, the conduit being oriented to induce a circular flow within the cylinder. A pump in the conduit draws the oil/water mixture from the concentration area and pumps it to the cylinder. In the cylinder the oil floats to and accumulates on the surface of the water therein and uncontaminated water is forced out of the open lower end of the cylinder. Proto-types of the invention have shown that there is very little emulsification of the oil and hence almost 100% recovery of oil from the oil/water mixture passed therethrough. There is control of the amount of oil/water mixture passed through the apparatus and of course there is control of the passage of the apparatus through the oil spill as the apparatus may be towed by an oil spill containment boom and the boats deploying it. Once the cylinder is full it may be replaced by an "empty" recovery unit or it may be emptied into any suitable larger receptacle as might be contained in, for example, a tanker ship or barge.

Broadly speaking therefore the present invention may be seen as providing a method of recovering oil from the surface of a body of water including the steps of: (a) moving apparatus comprising a collection unit defining a concentration area therein, a recovery unit having a vertically oriented open ended cylinder mounted therein with upper and lower portions extending above and below the water surface respectively, and a submerged pumping unit including a pump-containing conduit leading from the concentration area to an opening in the lower portion of the cylinder, through the oil contaminated water; (b) operating the pump to draw an oil/water mixture from the concentration area into the conduit; (c) continuing operation of the pump to force the oil/water mixture through the conduit and into the cylinder; and (d) flowing the oil/water mixture generally tangentially into the cylinder below the water surface whereby oil from the mixture will rise to and accumulate on the surface of water within the cylinder and uncontaminated water will flow downwardly through the lower open end of the cylinder.

The above method may be effectively carried out in accordance with the present invention by way of apparatus for recovering oil from the surface of a body of water comprising a collection unit, a pumping unit and a recovery unit, the collection unit including means for deflecting an oil/water mixture into a concentration area therein, the recovery unit including generally vertically oriented open ended holding means having a lower submerged portion, and the pumping means including submerged conduit means leading from the concentration area to an opening in the submerged portion of the holding means and containing pump means therein operable to continuously draw a quantity of the oil/water mixture from the concentration area and to feed the quantity through the conduit means to the holding means, whereat oil floats to and accumulates on the surface of water in the holding means and uncontaminated water exits from the open lower portion of the holding means.

DESCRIPTION OF THE PREFERRED EMBODIMENT

Structure

Figure 1:
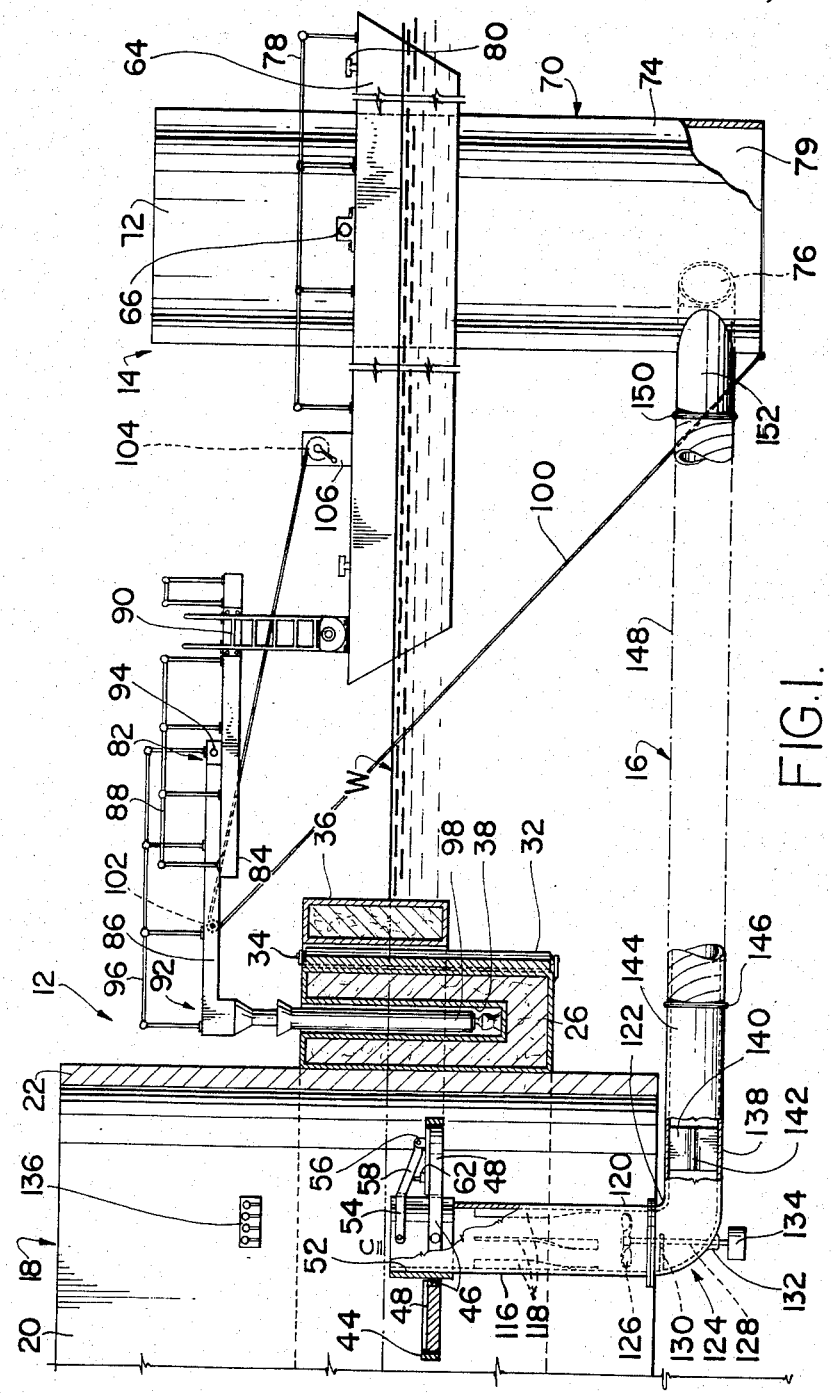
FIG. 1 is an elevation, partly in cross-section of an oil spill recovery apparatus of the present invention.

The oil recovery system of the recovery invention is designated by the reference number 10 and it includes three basic components, namely a collection unit 12, a recovery unit 14 and a pumping unit 16. The collection unit 12 is connected via the pumping unit 16, to the recovery unit 14.

The collection unit 12 will be described first of all with reference to both figures of the drawings. A retaining wall 18 is shown as being vertically oriented and as extending above and below the water line W. The retaining wall has a generally U-shape and is made up of a pair of opposed side walls 20 which may be parallel to each other or may diverge outwardly from the curved wall 22 which connects the walls together along one vertical edge thereof. The opposite vertical edges of the walls 20 define therebetween an open mouth area M which is spanned by a coarse mesh screen 24 which has upper and lower portions above and below the water line respectively to inhibit the entry of debris into the collection unit while still permitting the oil on the water to pass into the collection unit. At the water surface and generally in the vicinity of the center of curvature for the curved end wall 22 is a concentration area C, the significance of which will become more readily apparent hereinbelow.

A flotation boom 26 extends along the outer surface of the retaining wall 20 and is intended to maintain the retaining wall in its preferred orientation as discussed above. The flotation boom is generally rectangular in cross-section and may take the form of a metal casing containing flotation material such as an expanded cellular foam. By using a metal casing to contain the flotation material it is possible to attach other elements to the boom 26 and the flotation boom adds structural rigidity to the collection unit.

The flotation boom 26 has a curved portion 28 which follows the curved end wall 22. A plurality of curved, vertically oriented recesses 30 are provided in the outermost vertical surface of the curved portion 28 and each such recess contains a rotatable resilient bumper roller 32 such that a portion of the outer surface of the roller 32 projects outwardly of its recess. Each roller is mounted on a vertical shaft which in turn is connected to the metal casing at each vertical end as at 34. The rollers 32 serve to buffer any relative movement between the flotation boom 26 and a second air-filled boom 36. The rollers also serve to maintain a space between the booms 26 and 36 so as to avoid damage to the boom 36 which might occur if the two booms were to rub together.

The boom 26 is also provided with a relatively deep well 38 situated in the curved portion 28 and on the longitudinal center line of the unit 12. At the base of the well is one half of a ball-and-socket joint which will be utilized in the towing of the recovery unit 14 behind the collection unit 12 as to be discussed hereinbelow.

The inner wall of the flotation boom 26 mounts bearing means such as a pair of journal or pillow blocks 40, which blocks are mounted on an axis which is perpendicular to the longitudinal axis of the collection unit 12. Each pillow block 40 supports one end of a stub shaft 42, the opposite end of each stub shaft 42 being affixed to a support ring 44 normally situated below the water surface. The ring 44 may thus pivot on the axis of the stub shafts 42.

A central support ring 46 is concentrically located within the support ring 44 and has diametrically opposed mounting bars 48 secured thereto. Each bar 48 is pivotally attached to the outer support ring 44 as at 50 along the longitudinal axis of the collection unit 12 whereby the central support ring is pivotable about the longitudinal axis of the collection unit. Within the central support ring 46 is slidably disposed an elongated sleeve 52. A control yoke 54 is pivoted at its apex 56 to one of the bars 48 and at the opposite end of each leg 58 to the sleeve 52, on an axis parallel to the axis passing through the pillow blocks 40. A cross-bar 60 is secured to the legs 58 adjacent the apex and is attached in a conventional manner to the piston rod of a water impermeable pneumatic cylinder 62 mounted on the bar 48 between the apex 56 and the central ring 46. Actuation of the cylinder 62 will have the effect of pivotting the yoke about its pivot connection to the bar at the apex 56 whereby the sleeve 52 will slidably raise or lower within the central ring 46.

Figure 2:
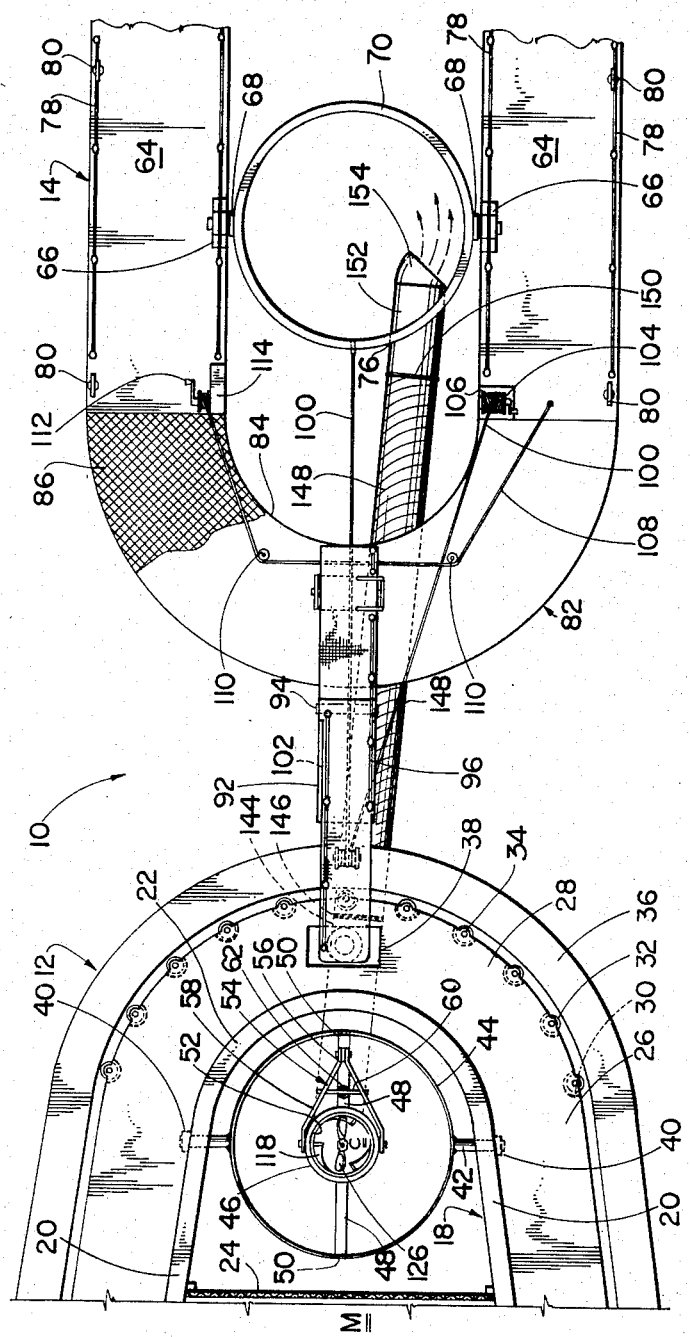
FIG. 2 is a plan view of the apparatus depicted in claim 1.

The recovery unit 14 will now be described with reference to the two figures of the drawings. As seen particularly in FIG. 2 a pair of flotation tanks 64 is provided. As with the flotation boom 26 the tanks 64 may be formed of metal and contain a suitable flotation material. Desirably the tank 64 will have a boat-hull-like configuration for good mobility through the water, the tanks being arranged catamaran-style as shown in FIG. 1.

Each tank mounts on its upper surface a journal or pillow block 66 so as to define a transverse axis therebetween. Each block in turn mounts one end of a stub shaft 68 with the opposite end of each stub shaft 68 being secured to a cylindrical holding tank 70. The tank 70 is open at both ends and has an upper portion 72 which projects above the water line W and a lower portion 74 which extends below the water line. The lower portion 74 is provided with an opening 76 the purpose of which will be described hereinbelow.

The upper surface of each tank 64 is provided with hand-rails 78 in a normal fashion and is also provided with a plurality of tie-up cleats 80.

The recovery unit 14 is connected to the collection unit 12 for towing thereby by a catwalk unit 82. The catwalk unit 82 includes a semicircular structure 84 covered by a screen 86 and is also provided with handrails 88. As seen in FIG. 1 the structure 84 is elevated with respect to the flotation tanks and a ladder 90 extends between the structure 84 and the top of each flotation tank 64. The catwalk unit is pivotally attached to the flotation tanks at the base of each ladder 90.

At the forward area of the structure 84 a tongue 92 is provided, the tongue being pivotally attached to the upper surface of the structure 84 as at 94. The tongue 92 is wide enough for a person to walk on and is provided with a handrail 96. At the forward end of the tongue 92 a downwardly extending leg 98 fits within the well 38 and has the other half of the ball-and-socket joint secured thereto for mating engagement with the one half already provided at the base of the well 38. Once the joint is secure it is seen that the recovery unit 14 is connected to the collection unit 12 by the catwalk unit 82 and that a degree of freedom between the units 12 and 14 is provided by the ball-and-socket joint and the other pivotal connections, as between the tongue 92 and the structure 84, and between the structure 84 and the flotation tanks 64.

Two further areas of adjustment on the recovery unit are provided. First of all, a stabilizing cable 100 is secured, at one end to the bottom of the holding tank 70. The cable passes over a pulley 102 mounted on the tongue 92 and has its other end secured to a winch 104 mounted on a pedestal 106 atop one of the flotation tanks 64. This mechanism serves two purposes: it maintains the holding tank 70 in a generally vertical orientation during towing and it permits a controlled pivoting of the holding tank 70 on its stub shafts 68 whenever such is desired.

The second adjustment mechanism is provided by the cable 108 which is anchored at one end to one of the flotation tanks 64, passes over a pair of pulleys 110 atop the catwalk structure, and is anchored at the other end to a winch mounted on a pedestal 114 on the other of the flotation tanks. With this mechanism the catwalk unit 82 may be pivotally raised or lowered relative to the recovery unit 14.

The pumping unit 16 will now be described with particular reference to FIG. 1 of the drawings. Below the concentration area C of the collection unit 12 the slidable sleeve 52 is secured to or may be integral with a generally vertical conduit portion 116. Portion 116 continues the sleeve 52 downwardly below the concentration area C and is, of course, slidably vertically adjustable along with the sleeve 52. Contained within the conduit portion 116 is a plurality of similar spiral vanes 118 affixed to the inside wall of the conduit portion 116, which vanes impart a spiral or swirling effect to any fluid passing thereby.

Below the conduit portion 116 is a pumping portion 120 which includes a generally 90° elbow portion 122. Within the pumping portion 120 and between the vanes 118 and the elbow portion 122 is a pump 124 having vanes 126 in the form of propeller blades affixed to a shaft 128. The shaft is maintained coaxial with the conduit and pumping portions 116 and 120 by one or more shaft supports 130. Shaft 128 passes downwardly through a sealed opening 132 in the elbow portion 122 and terminates at a submergible drive motor 134. The motor 134 as well as the height of the sleeve 52 is controlled by an operator situated on the collection unit 12 and provided with appropriate controls 136 mounted thereon. As the necessary circuitry to achieve effective control is well within the expertise of a skilled person in the art it is not considered necessary to discuss the details of such circuitry.

The elbow portion 122 feeds into a rectifier portion 138 which contains vertical and horizontally oriented vanes 140 and 142 respectively. From the rectifier portion 138 a first flexible conduit 144 extends to a sealable joint 146 to which is removably secured a second flexible conduit 148. Conduit 148 extends between the collection unit 12 and the recovery unit 14 and terminates at a second sealable joint 150. Also secured to the second joint 150 is a third length of conduit 152 which in turn sealably feeds into the opening 76 in the lower portion 74 of the holding tank 70. The conduit 152 is oriented relative to the holding tank 70 so that the axis of the conduit 152, and of the conduits 144 and 148 as well, is not aligned with the longitudinal centreline of the units 12 and 14, and hence is not aligned with a radius of the holding tank. This is for the purpose of imparting a circular or spiral motion to fluid exiting from the conduit 52 into the holding tank 70. This effect is further enhanced by an outlet deflector cap 154 which may be secured to the end of the conduit 152 within the holding tank 70, the cap 154 serving to deflect fluid from the conduit 152 towards the inner wall of the holding tank 70.

Operation

The operation of the present invention will now be described, with particular reference to FIG. 1. For such description it is assumed that the complete assembly has been towed, floating on the surface of the water, to an oil spill site by suitable means, as by a tug boat. During such towing operation it is suggested that the length of conduit 148 be disconnected at the joints 146 and 150 to avoid damage and that the holding tank 70 be winched up, as by cable 100, to a generally horizontal attitude to improve the towability of the unit 14 and to avoid damage to the tank.

Once the spill site has been reached the holding tank is lowered so as to assume its generally vertical orientation as shown in FIG. 1 and the conduit 148 is connected at the joints 146, 150. The collection unit is then towed into the spill, connected to a containment boom towed by suitable boats, with the recovery unit being towed by the collection unit. An oil/water mixture is funnelled by the walls 20 into the general vicinity of the collection area C due to the forward movement of the collection unit into the spill. The opening of the sleeve 52 is maintained, under operator control, just below the level of the oil floating on the water surface and the motor 134 is turned on. The motor drives the pump 124 so that an oil/water mixture is drawn downwardly from above the sleeve 52 into the sleeve past the spiral vanes 118. The spiral vanes induce a degree of turbulence into the oil/water mixture, thereby tending to break up the oil from a continuous film or layer into smaller particles which flow more easily past the pump 124 and through the conduits 144, 148 and 152. The rectifier 138 smoothes out the flow of oil/water mixture through the conduits and thus permits some rejoining of the oil particles during the passage through the conduits. The oil/water mixture flows through the conduits 144, 148 and 152 and is deflected by the deflector cap 154 into a flow pattern which is circular and essentially laminar, following the inner wall of the holding tank 70. During such flow within the tank the oil, having a lower specific gravity than the water tends to rise to the surface of the water within the tank. Uncontaminated water will eventually flow out through the open bottom end of the tank.

The tank will eventually contain so much oil that it will, in essence, be full. At that point in time a barge or other vessel could be brought alongside the recovery unit and the oil contained therein could be transferred by conventional means to the barge for appropriate disposal. As an alternative it would be possible to disconnect the full recovery unit from the collection unit, as by disconnecting the ball-and-socket joint and the conduit joint 150 and to connect an empty recovery unit to the collection unit. The full recovery unit could then be towed to a shore installation for disposal of the oil contained in the full holding tank thereof. Of course, any other suitable method for disposing of oil in the full holding tank could be utilized without departing from the spirit of the present invention.

It is understood, of course, that a skilled person in the art could alter the structure of the described apparatus without departing from the spirit of the present inven- The embodiments of the invention in which an exclusive property or privilege is claimed are defined as follows:

1. Apparatus for recovering oil from the surface of a body of water comprising: a collection unit; a separate recovery unit pivotally connected to said collection unit; and a pumping unit; said collection unit including generally vertically oriented wall means extending above and below the surface of the body of water for deflecting an oil/water mixture into a concentration area therein; said recovery unit including flotation tank means and a generally vertically oriented open-ended cylinder pivotally mounted to said flotation tank means and having a lower submerged portion; and said pumping unit including submerged conduit means leading from an inlet thereof maintained below the level of the oil on the surface of the water at said concentration area to an opening in the submerged portion of said cylinder and containing pump means therein operable to continuously draw a quantity of said oil/water mixture from said concentration area and to feed said quantity through said conduit means to the submerged portion of said cylinder, whereat oil rises to float and accumulate on the surface of water in said cylinder and uncontaminated water exits from the open lower portion of said cylinder.

2. Apparatus according to claim 1 wherein said wall means includes a pair of vertically oriented retaining walls and a curved end wall joining said retaining walls together, said concentration area being essentially equidistant from said retaining walls and said end wall.

3. Apparatus according to claim 2 wherein said retaining walls define a mouth area opposite said end wall for feeding the oil/water mixture to said concentration area.

4. Apparatus according to claim 2 and including flotation means secured to said retaining walls and said end wall for maintaining said collection unit in a generally vertical orientation relative to the surface of said body of water.

5. Apparatus according to claim 4 wherein said flotation means includes a generally rectangular metal casing secured to the outer surface of said retaining walls and end wall, said casing being filled with flotation material.

6. Apparatus according to claim 5 including bearing means secured within said metal casing, defining an axis transverse to the longitudinal centerline of said collection unit, each bearing means mounting a stub shaft therein which extends on said axis towards said concentration area, said stub shafts mounting therebetween a large diameter outer support ring, said ring and shafts being pivotable about said axis.

7. Apparatus for recovering oil from the surface of a body of water comprising: a collection unit; a separate recovery unit pivotally connected to said collection unit; and a pumping unit; said collection unit including a pair of vertically oriented retaining walls extending above and below the surface of the body of water, a curved end wall joining said retaining walls together and defining with said retaining walls an oil/water concentration area essentially equidistant from said walls, a generally rectangular metal casing secured to the outer surface of said retaining walls and end walls defining flotation means for maintaining said collection unit in a generally vertical orientation relative to the surface of said body of water, bearing means secured within said casing and defining an axis transverse to the longitudinal centerline of said collection unit, each bearing means mounting a stub shaft therein which extends on said axis towards said concentration area, said stub shafts mounting therebetween a large diameter outer support ring such that said ring and said shafts are pivotable on said axis, said outer support ring pivotally mounting a pair of inwardly extending mounting bars on an axis coincident with the longitudinal centerline of said collection unit, and a central support ring mounted between said bars at said collection area; said recovery unit including generally vertically oriented open-ended holding means having a lower submerged portion; and said pumping unit including submerged conduit means leading from said central support ring at said concentration area to an opening in said submerged portion of said holding means and containing pump means therein operable to continuously draw a quantity of an oil/water mixture from said concentration area and to feed said quantity through said conduit means to said holding means, whereat oil floats and accumulates on the surface of water in said holding means and uncontaminated water exits from the open lower portion of said holding means.

8. Apparatus according to claim 7 including sleeve means connected to said conduit means at said concentration area and slidable within said central support ring, yoke means having an apex and a pair of divergent legs with the apex being pivotally secured to one of said mounting bars and each leg being pivotally secured to said sleeve means at a point above said transverse axis, and drive means mounted on said one mounting bar and connected to said yoke means such that operation of said drive means effects a pivotting movement in said yoke means to raise or lower said sleeve means.

9. Apparatus according to claim 7 wherein said casing includes a plurality of spaced apart vertically oriented rollers in an outer vertical wall thereof adjacent said curved end wall, said rollers abutting further flotation means extending parallel to and secured to the first-mentioned flotation means.

10. Apparatus according to claim 8 wherein said recovery unit includes a pair of flotation tank means spaced apart from each other, each mounting a bearing block defining a pivot axis transverse to the longitudinal centerline of said recovery unit, and said holding means is an open ended cylinder affixed to a pair of diametrically opposed stub shafts pivotally mounted in said bearing blocks, said cylinder also having an upper portion extending above the surface of the body of water, said upper portion being shorter than said submerged lower portion.

11. Apparatus according to claim 10 including a catwalk means pivotally connecting said recovery unit and said collection unit, said catwalk means being secured to a forward portion of said flotation tank means and having a tongue extending forwardly thereof for connection to said collection unit.

12. Apparatus according to claim 11 wherein the connection between said recovery unit and said collection unit is achieved by a ball-and-socket joint, one half of which joint is contained in a well in said metal casing on the centerline of said collection unit, the other half of which joint is formed on a downwardly depending arm affixed to said tongue, which arm is receivable in said well.

13. Apparatus according to claim 11 including first winch means on one of said flotation tank means and a first cable extending from said winch means to a pulley on said tongue and then to the lower portion of said cylinder for altering the vertical orientation of said cylinder, and including second winch means on one of said flotation tank means and a second cable extending from said second winch means to a pair of pulleys on said catwalk means and then to the other of said flotation tank means for pivotally altering the location of said catwalk means relative to said flotation tank means.

14. Apparatus according to claim 10 wherein said conduit means includes: a first conduit extending downwardly from said sleeve means and having a plurality of spiral vanes on an inner surface thereof, said first conduit also mounting said pump means therein; an elbow portion extending downwardly and away from said first conduit; a second conduit extending from said elbow portion towards said recovery unit, having a pair of axially directed rectifier plates therein and terminating at a first sealable joint; a third flexible conduit extending from said first joint towards said recovery unit, spanning the distance between said collection unit and said recovery unit, and terminating at a second sealable joint; and a fourth conduit extending from said second joint through said opening in the lower portion of said cylinder and into said cylinder.

15. Apparatus according to claim 14 wherein said fourth conduit is oriented on an axis which is generally tangential to the inner surface of said cylinder and terminates in a deflection cap adapted to deflect oil/water mixture flowing from said fourth conduit into said cylinder generally towards the inner surface of said cylinder.

16. Apparatus according to claim 7, wherein said retaining walls define a mouth area opposite said curved end wall for feeding an oil/water mixture to said concentration area.

* * * * *